United States Patent [19]

Allen

[11] Patent Number: 5,345,688
[45] Date of Patent: Sep. 13, 1994

[54] METHOD AND DEVICE FOR MEASURING SQUARENESS OF ICE SKATE BLADES

[76] Inventor: Robert H. Allen, 155 Bechard Ave., LaSalle, Ontario, Canada, N9J 1W4

[21] Appl. No.: 66,842

[22] Filed: May 26, 1993

[51] Int. Cl.$^5$ ............................................. G01B 5/24
[52] U.S. Cl. ................................... 33/535; 33/533; 33/679.1; 280/809
[58] Field of Search ............. 33/1 R, 1 BB, 3 R, 3 A, 33/274, 285, 501, 196, 533, 535, 650, 534, 679.1; 280/809; 73/104

[56] References Cited

U.S. PATENT DOCUMENTS

| | | | |
|---|---|---|---|
| 1,017,639 | 2/1912 | Mershon | 33/501 |
| 1,345,597 | 7/1920 | Jantsch et al. | |
| 1,421,895 | 7/1922 | Bateman | 33/533 |
| 1,441,129 | 1/1923 | Smith et al. | |
| 1,965,131 | 7/1934 | Simpson | 33/535 |
| 2,487,844 | 11/1949 | Bigham | 33/501 |
| 2,745,183 | 5/1956 | Pe Queen | 33/533 |
| 2,815,582 | 12/1957 | Karstens | 33/533 |
| 3,382,582 | 5/1968 | Matson | |
| 3,730,631 | 5/1973 | Streander | 33/534 |
| 4,021,054 | 5/1977 | Csutor | 280/11.37 R |
| 4,161,822 | 7/1979 | Ayvazian | 280/809 |
| 4,379,563 | 4/1983 | Arsenault | 280/809 |
| 4,497,119 | 2/1985 | Dearman | 33/534 |
| 4,680,869 | 7/1987 | Murkens | |
| 5,133,135 | 7/1992 | Durfee, Jr. | |

FOREIGN PATENT DOCUMENTS

| | | | |
|---|---|---|---|
| 1159484 | 12/1983 | Canada | 280/809 |
| 1340776 | 9/1987 | U.S.S.R. | 280/809 |

*Primary Examiner*—Thomas B. Will
*Attorney, Agent, or Firm*—Lowe, Price, LeBlanc & Becker

[57] ABSTRACT

An ice skate blade squaring device comprises a squaring body which is removably mountable to an ice skate blade. The squaring body includes a standard squaring line across one face thereof. Arranged on each end of the squaring line are sets of graduations which are utilized in determining the out of squareness of the skate blade. An angle is provided which is magnetically attachable to the skate blade. The angle is designed to abut against the face of the squaring body having the squaring indica thereon. Once the angle is abutted to the squaring frame, a visual determination of the intersection of a free edge of the angle with the squaring indicia permits a simple and accurate determination of the out of squareness of the ice skate blade. In another embodiment, a squaring body includes an arm pivotally mounted thereto. The arm supports a dial indicator which assists in determining the squareness of the skate blade. The squaring body and arm maintain a dial indicator parallel to the skate blade side surface to assure accuracy in determining out of squareness.

13 Claims, 4 Drawing Sheets

METHOD AND DEVICE FOR MEASURING SQUARENESS OF ICE SKATE BLADES

FIELD OF THE INVENTION

The present invention relates to an ice skate blade squaring device and method and, in particular, a device designed to indicate the squareness of an ice skate blade edge.

BACKGROUND ART

In the prior art, various devices have been proposed to determine squareness or perpendicularity of surfaces. In one type, a dial indicator is placed against a surface for which squareness is to be measured. U.S. Pat. No. 1,345,597 to Jantsch et al teaches a perpendicularity indicator using a dial indicator to measure the perpendicularity of an object. U.S. Pat. No. 5,133,135 to Durfee, Jr. discloses an angled gauge also utilizing a dial indicator to determine the squareness of surfaces on a work piece.

In the field of ice skate blades, U.S. Pat. No. 4,161,822 teaches a skate blade analyzer for determining the tangent or high point of the edge of the ice skate blade. Determination of the tangent enables a skate sharpener to change the location of the tangent point, if necessary, to improve the skater's performance.

In preparing ice skate blades for skating, it is important to make the ice skate blade edge square or perpendicular with respect to the blade side surface. When the blade edge of an ice skate is out of square, the skater must overcompensate through excessive leaning in one direction or the other. The degree of leaning is dependent on the amount the blade is out of square. This overcompensation and excessive leaning contributes to skate release and an increased incidence of falling due to the shift in body weight.

Prior art methods employ a crude visual test to determine skate blade squareness. For example, a coin such as a quarter is placed on the skate blade edge and a visual comparison is made with respect to the quarter and the blade side surface to judge squareness of the blade. However, these prior art methods are subject to error and inaccuracy and fail to give a consistent and accurate reading of the perpendicularity of the skate blade edge with respect to the skate blade side.

In view of the disadvantages of prior art methods, a need has developed to provide improved devices and methods for determining the squareness or perpendicularity of ice skate blade edges.

SUMMARY OF THE INVENTION

It is a first object of the present invention to provide a method and device for measuring the squareness of ice skate blades.

Another object of the present invention is to provide a device and method for measuring the squareness of ice skate blades which provides high accuracy.

It is a still further object of the present invention to provide a device and method for measuring the squareness of an ice skate blade which is simple in design and easy to use.

Other objects and advantages of the present invention will be readily apparent as the description thereof proceeds.

In satisfaction of the foregoing objects and advantages, there is provided an ice skate blade squareness measuring device comprising a frame and an angle removably mountable to a skate blade edge of the ice skate. The frame has a plurality of squareness indicia on a face thereof and a means for removably mounting the frame onto a portion of the ice skate blade. The angle is sized in conjunction with the frame so that a free edge of the angle intersects the squareness indicia to indicate whether the skate blade edge is square with respect to the blade side.

The present invention also teaches a method of determining the squareness of an ice skate blade which comprises the steps of establishing a standard line generally perpendicular to a side of the ice skate blade. The standard line includes two sets of graduations, each set arranged symmetrically about the standard line and being spaced from each other. Each of the graduations have a predetermined squareness value. In the next step, a squaring line is produced which corresponds to the ice skate blade edge. The squaring line is visually compared to the standard line for intersection of the squaring line with the graduations. The total number of graduations between the intersection points and the standard line are totaled to determine a squareness value based upon the value of each graduation.

In another embodiment, an ice skate blade squareness measuring device comprises a body having a slot through a portion thereof with opposing faces and means for engaging the ice skate blade in the slot. Also provided is an arm pivotally attached to the body and a dial indicator. The dial indicator is mounted to the arm so that a distal end thereof can rotate and contact a portion of an edge of said ice skate blade to measure out of squareness of the ice skate blade edge.

BRIEF DESCRIPTION OF DRAWINGS

Reference is now made to the drawings accompanying the invention, wherein.

DESCRIPTION OF THE PREFERRED EMBODIMENTS

The inventive device and method overcome deficiencies in prior art methods for measuring the squareness of ice skate blades. The present invention provides a simple but effective means to measure the squareness of the blade edge of an ice skate blade after skate sharpening has been performed. Moreover, the inventive device provides a low cost alternative to expensive dial indicators and provides high accuracy for determining the degree for which skate blades are out of square.

Figure 1:
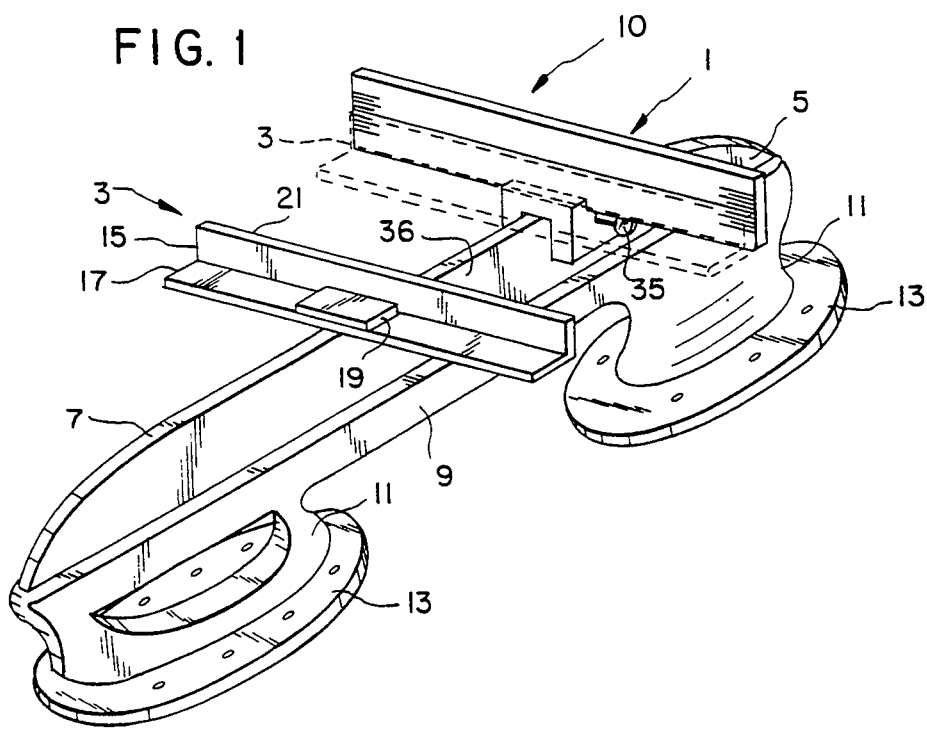
FIG. 1 is a perspective view of the present invention mounted on a skate blade with components separated to show greater detail.

With reference now to FIG. 1, the inventive device for measuring the squareness of an ice skate blade is generally designated by the reference numeral 10 and is seen to include a squaring frame 1 and an angle 3. The angle 3 is shown spaced from the squaring frame 1.

The squaring frame 1 is removably mounted around an ice skate blade 5. The ice skate blade 5 having blade edge 7 is mounted in a blade holder 9 which is mounted to an ice skate boot (not shown) by supports 11 and flanges 13.

In use, the angle 3 is placed on the blade edge 7 adjacent the squaring frame 1 as indicated in phantom in FIG. 1. Although the squaring frame 1 is shown attached to the skate blade at a given location, a preferred location is the midpoint of the blade. However, other locations on the blade may be utilized for determining squareness.

The angle 3 includes legs 15 and 17 forming a 90° angle. Disposed on leg 17 is a magnet 19 which facilities attachment of the leg 17 to the blade edge 7. The magnet 19 may be attached in any conventional manner such as through the use of an adhesive or the like. The upstanding leg 15 has a free edge 21 which is used to determine squareness in conjunction with the squaring frame 1.

Figure 2:
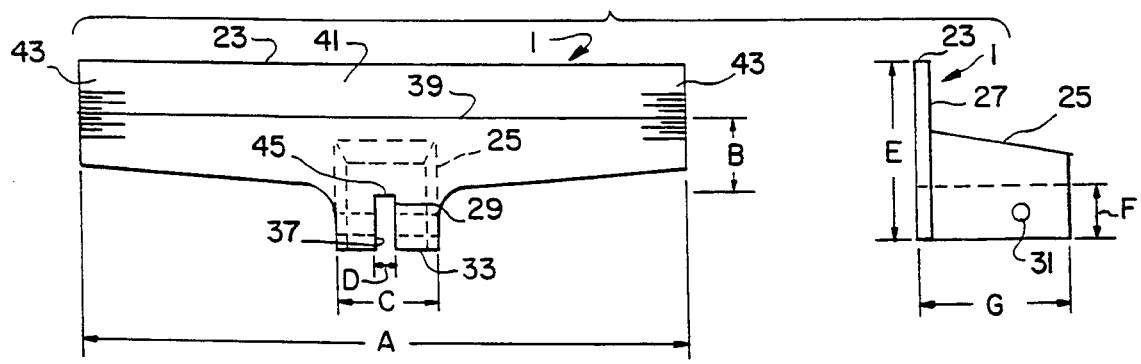
FIG. 2 is a front and side view of the squaring frame removed from the ice skate blade.
Figure 2A:
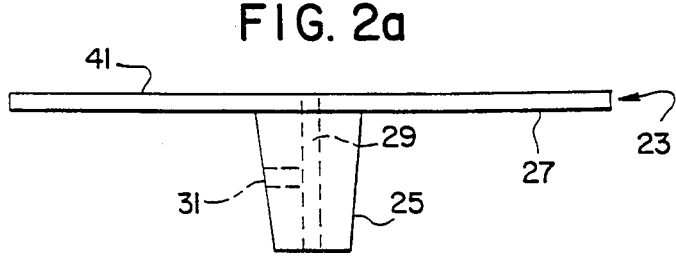
FIG. 2a is a top view of the squaring frame shown in FIG. 2.

With reference to FIGS. 2 and 2a, the squaring frame 1 includes an elongated member 23 and a frame body 25. The frame body 25 extends outwardly from the face 27 of the elongated member 23 and generally bisects the width thereof. The frame body 25 and elongated member 23 have a slot 29 therethrough of given height and width. The slot 29 is sized to receive the blade 5.

The frame body 25 also has a through hole 31 through leg 33 thereof. The through hole is internally threaded to receive a set screw 35, see FIG. 1 The set screw 35 extends through the hole 31 to contact the side 36 of the blade 5. Rotating the set screw forces the opposite side of the blade 5 against the face 37 in slot 29.

The elongate member 23 has a squaring line 39 on face 41 thereof. The squaring line 39 is perpendicular to the face 37 so that the skate blade side surface 36 when inserted in slot 29 is also perpendicular to the squaring line 39. The distance from the squaring line 39 to the slot surface 45 should be equal to the width of the leg 15.

Graduations 43 are located on the face 41. The graduations are symmetrically arranged about the squaring line 39 and arranged on opposite ends of the elongated member 23. The squaring line 39 and graduations 43 are used in conjunction with the angle 3 in determining the squareness of the blade 5 as will described hereinafter.

Figure 3:
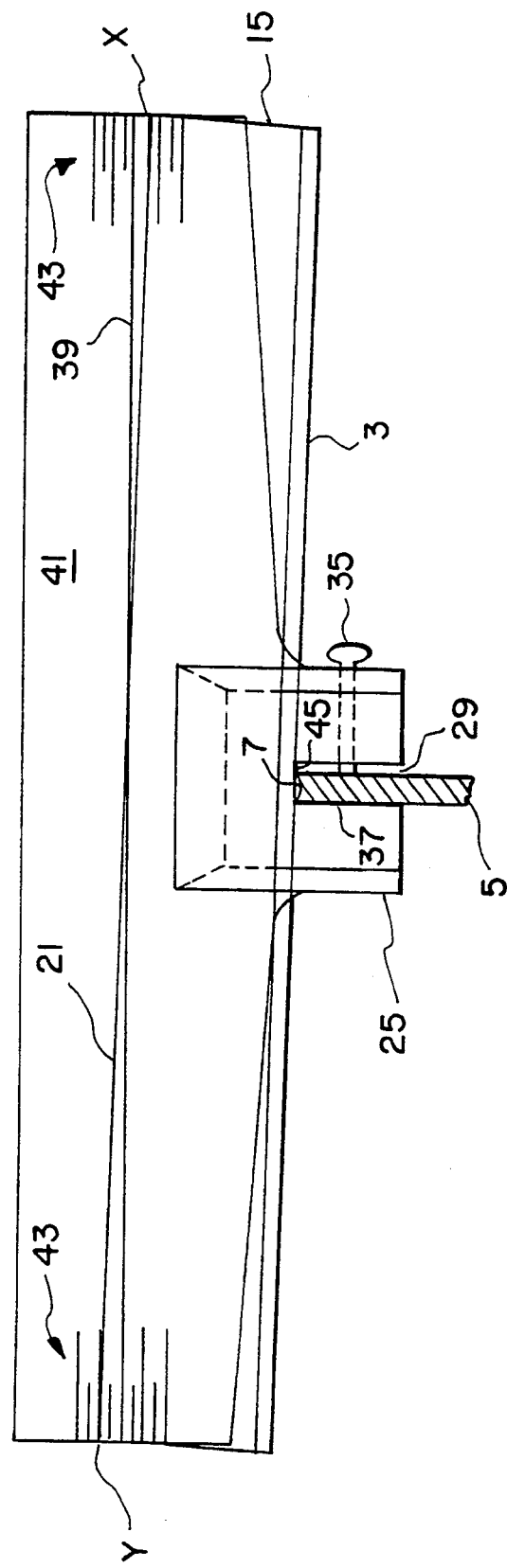
FIG. 3 is a front view of the ice skate blade squaring device in an exemplary use.

With reference to FIG. 3, an exemplary use of the device depicts the angle 3 abutted against the face 41 to determine out of squareness of a skate blade 5. The skate blade 5 is mounted within the slot 29 of the body 25 and arranged against face 37. The blade 5 should be mounted in the slot 29 such that the surface 45 of the slot is adjacent the blade edge 7. Alternatively, a protector such as a thin strip of leather may be disposed against the surface 45 to protect the blade edge 7 from damage by contact with the slot inner faces. Once the blade 5 is securely mounted to the frame body, the angle 3 is magnetically placed on the blade edge 7 and abutted against the face 41. Once the angle is abutted against face 41, the free edge 21 of the leg 15 can be compared to the squaring line 39 and graduations 43. Although a magnet is illustrated to secure the angle to the blade edge, the angle could be pivotally mounted to the squaring body via a pin or the like. In this embodiment, the angle could rotate about the pin to indicate out of squareness.

As can be seen from FIG. 3, the free edge 21 shows a $\Delta y$ of two increments for one set of graduations with a $\Delta x$ of one increment for the other set of graduations. Each of the graduations 43 represents an incremental value for out of squareness for the skate blade 5. Thus, total out of squareness is determined by adding the total number of increments x and y. In this example, the free edge 21 indicates an outer squareness of three increments or three thousands of an inch ($2y+x=3$). When perfectly square, the free edge 21 should align with squaring line 39.

The relationship between each of the graduations 43 and the level of out of squareness is determined by the dimensions of the squaring frame 1 and angle 3. With reference back to FIG. 2, the squaring frame 1 has an overall width designated as A. The distance between the squaring line 39 and slot bottom 45 is designated as letter B. The frame body width and slot width are designated by letters C and D, respectively. The overall height of the frame body is designated by letter E with the slot height corresponding to letter F and overall length of the frame body 1 corresponding to letter G. In a preferred embodiment, $A=6$ inches, $B=0.75$ inches, $C=1$ inch and $D=0.19$ inches. Width E corresponds to 1.76 inches with the slot depth equaling 0.50 inches and dimension G equaling 1.5 inches. With this arrangement of dimensions, each of the graduations 43 should be spaced at 0.5175 inch intervals. With these dimensions each graduation represents an out of squareness value of 0.001". The determination of the interval length of each gradation is determined by geometrical analysis and comparison between the outer square skate blade based upon its width and the width A shown in FIG. 2.

Figure 4:
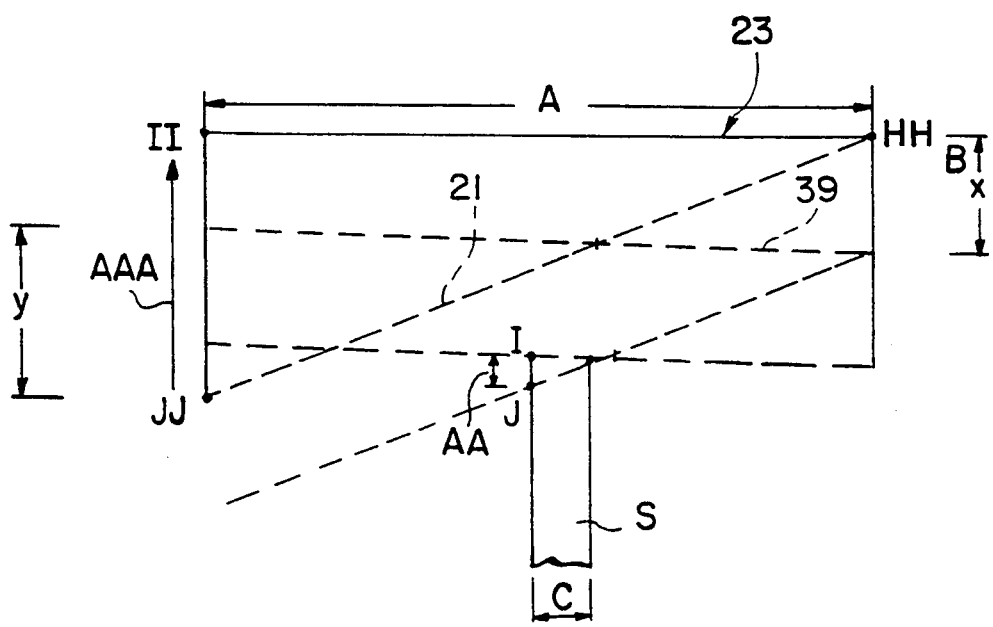
FIG. 4 is a schematic diagram showing the relationship between the blade edge out of squareness and the inventive device.

With reference now to FIG. 4, an exemplary skate blade edge 5 is depicted with an out of squareness amount AA. The out of square blade edge also forms a triangle H, I, J with respect to a line perpendicular to the blade side. A corresponding triangle HH, II, JJ is formed by the width A of the frame 23 and the free edge 21 of the angle 3. The leg AAA of this triangle corresponds in ratio to the out of squareness amount AA of the blade 5. As can be readily seen from this figure, the value AAA is equal to the sum of x and y as determined using the standard squaring line 39. By knowing A and the values of x and y and the width of the blade 5, one skilled in the art can geometrically establish the relationship between the out of squareness value AA and the values x and y. Since this geometric analysis is considered to be well within the art, a further detailed explanation is not deemed necessary.

Although specific dimensions are given above for the disclosed embodiment, other dimensions may be utilized to test the squareness of skate blades. For example, a wider device may be utilized or a different dimensioned angle 3 and distance between the squaring line 39 and the slot bottom 45 can be employed. Moreover, the angle may be placed on the edge and spaced in close proximity to the squaring frame, e.g. about ⅛ inch.

Preferably the squaring frame and angle are made of a non-metallic material such as aluminum. In this manner, the magnet is optimally attached to the blade edge. Further, attraction of the magnet to the squaring body frame is avoided, such an attraction interfering with leveling of the angle.

It is anticipated that the accuracy of the inventive device should be plus or minus 0.0005 inches. This is predominately based upon the restraints imposed in the accuracy of the graduations 43 on the face 41 as well as such factors as line widths or the like.

In practicing the method according to the present invention, the squaring line 39 serves as a standard line for comparison with the free edge 21 of the angle 3. Visual comparison of the free edge 21 to the standard squaring line 39 shows either an intersection of the free edge 21 with one of the graduations 43 spaced from the standard squaring line 39 or displacement adjacent thereto. The interaction of the free edge 21 with the graduations establishes a number of graduations spaced from the standard squaring line 39. It should be understood that if the free edge bisects or is in between two adjacent graduations, the graduation furthest from the standard squaring line 39 is selected in determining squareness. The visual comparison determines the number of graduations between the standard squaring line 39 and the free edge for each side of the squaring frame. Totaling these graduations provides a value which determines the out of squareness of the skate blade and based upon the relationship as described above between each graduation and the out of squareness increment as described above.

Figure 5:
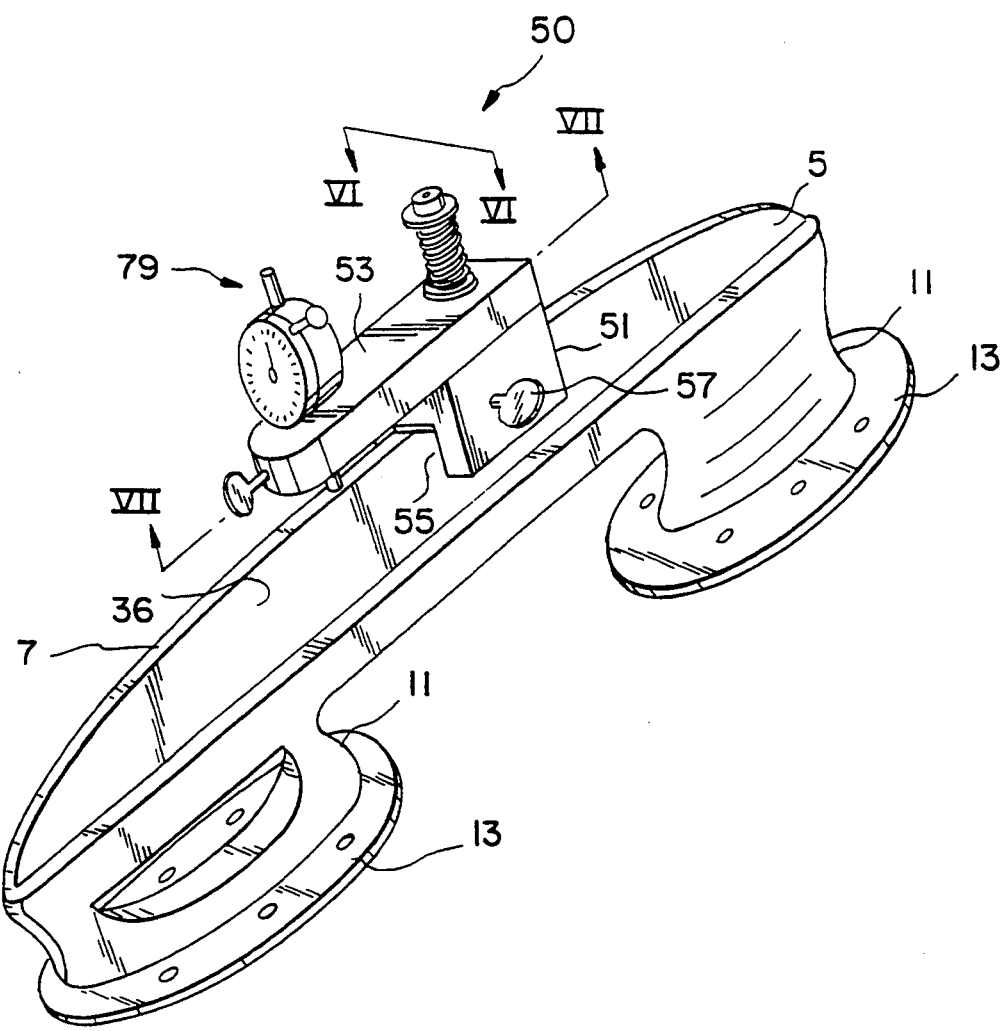
FIG. 5 is a perspective view of second embodiment of the invention mounted on a skate blade.

With reference now to FIG. 5, another embodiment of the present invention, generally designated by the reference numeral 50 is shown mounted to the skate blade depicted in FIG. 1. The skate blade squareness measuring device 50 includes a body 51 and an arm 53 pivotally attached thereto. The body 51 has a slot 55 to receive the skate blade 5. The body 51 is securely mounted to the skate blade 5 via set screw 57. It should be understood that the set screw 57 functions in a similar manner as the set screw 35 as described in FIGS. 1 and 3. Optionally, the slot 55 can include a leather strip 95 to protect the blade edge 7 when inserted within the slot.

Figure 6:
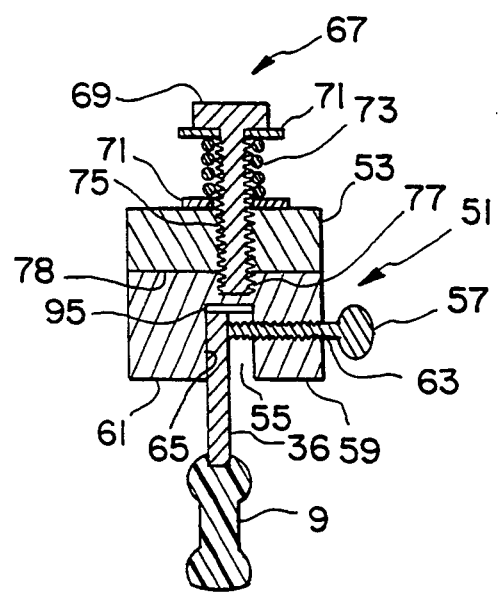
FIG. 6 is a cross-sectional view along line VI—VI of FIG. 5.

With reference now to FIGS. 5 and 6, the body 51 includes a pair of legs 59 and 61. Leg 59 has a threaded opening 63 designed to threadably receive the set screw 57. As can be seen from FIG. 6, the set screw 57 forces the blade surface 36 against the face 65 of the slot 55. This action maintains the skate blade side surface parallel to the face 65 so that the dial indicator, as described below, is parallel thereto.

Still with reference to FIG. 6, the arm 53 is pivotally mounted to the body 51 via the adjusting screw assembly 67. The adjusting screw assembly 67 comprises a threaded bolt 69, washers 71 and tensioning spring 73. The threaded bolt 69 extends through the through opening 75 in the arm and threadably engages a complementary threaded recess 77 in the upper face of the body 51. The spring 73, preferably a four pound spring, biases the arm 53 against the body 51. This biasing facilitates accurate measurements of out of squareness of the skate blade 5 as will be described herein below.

Figure 7:
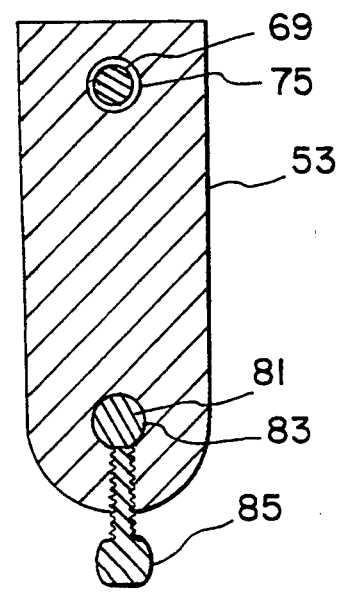
FIG. 7, is a cross-sectional view along the line VII—VII of FIG. 5.

With reference now to FIGS. 5 and 7, the skate squareness measuring device 50 also includes a dial indicator 79. It should be understood that any dial indicator capable of measuring a minute distance is adaptable for use with the present invention. A preferred dial indicator is a Mitutoyo dial indicator measuring in increments of 0.0005 inches to 0.075 inches. The dial indicator has an enlarged portion 81 which engages a corresponding through hole 83 in the arm 53. The dial indicator is secured in place by the set screw 85. It should be understood that the axis of through hole 83 should be parallel to the face 65 of the slot 55. In conjunction with the parallel relationship between the axis of the through hole 83 and the face 65, the arm lower face 78 should be perpendicular to the face 65. These configurations facilitate maintaining the perpendicular pivotal movement of dial indicator 79, generally with respect to the side face 36 of the blade 5 to enable out of squareness measurement of the skate blade edge.

Figure 8:
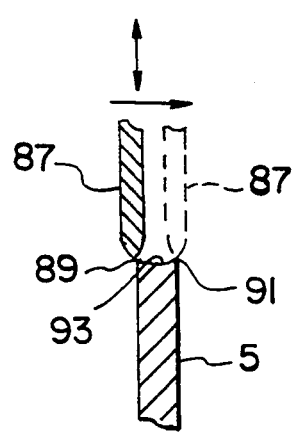
FIG. 8 is a sectional view of a blade edge and dial indicator showing movement thereof.

In use, and with reference to FIG. 8, the distal end 87 of the dial indicator is positioned to rest against the edge 89 of the skate blade 5. The enlarged portion 81 is secured in place by the set screw 85 and the dial indicator is adjusted to its zero point. After this adjustment, the arm 53 is pivoted such that the dial indicator distal end 87 rotates and contacts the opposing edge 91 of the skate blade 5. If the edge 91 is out of square with respect to the edge 89, the dial indicator will indicate the out of squareness as measured by its indicated increments. Moreover, and since the dial indicator is capable of indicating plus or minus measurements, the dial indicator will indicate whether the edge 91 is higher or lower than the edge 89. The dial indicator can also measure the hollow 93 by positioning the distal end 87 within the hollow. The appropriate adjustments can then be made to the skate blade edge to maintain a square edge.

The set screw 85 adjustment of the enlarged portion 81 of the dial indicator provides flexibility in adjusting the dial indicator after a skate blade has been repeatedly ground through sharpening. That is, the dial indicator may be lowered through the through opening 83 to maintain contact between the distal end 87 and a skate blade 5.

Although a spring biased pivoting arrangement is depicted to achieve the pivotal movement of the arm 53 with respect to the body 51, other pivoting arrangements may be utilized to permit movement of the dial indicator. Likewise, other means of securing the dial indicator in place as well as the holder 51 may be utilized with the present invention.

The arm 53 and body 51 are preferably constructed of an aluminum alloy of sufficient strength to be readily machined to tight tolerances to maintain the parallel and square or perpendicular relationships described above. Of course, any material having sufficient strength and machinability or forming properties to achieve the disclosed relationships is adaptable for use with the present invention.

As such, an invention has been disclosed in terms of preferred embodiments thereof which fulfill each and every one of the objects of the present invention as set forth hereinabove and provides a new and improved method and device measuring the squareness of an ice skate blade.

Of course, various changes, modifications and alterations from the teachings of the present invention may be contemplated by those skilled in the art without departing from the intended spirit and scope thereof. Accordingly, it is intended that the present invention only be limited by the terms of the appended claims.

I claim:

1. An ice skate blade squareness measuring device comprising:

a) a frame, said frame having a plurality of squareness indicia on a face thereof, said frame including means for removably mounting said frame onto a portion of said ice skate blade such that said squareness indicia are perpendicular to a side of said ice skate blade; and b) means removably mountable to a skate blade edge of said ice skate blade for indicating squareness of said blade edge in conjunction with said squareness indicia.

2. The ice skate blade squareness measuring device of claim 1 wherein said means for removably mounting said frame further comprises a slot in a portion of said frame for receiving said portion of said ice skate blade and means for securing said portion of said ice skate blade in said slot.

3. The ice skate blade squareness measuring device of claim 2 wherein said frame includes an elongated member having said face thereon and a body attached to said elongated member, said body generally bisecting said elongated member and including both said slot and said means for securing said portion of said ice skate blade in said slot.

4. The ice skate blade squareness measuring device of claim 2 wherein said means for securing said portion of said ice skate blade comprises a set screw threadably mounted on said frame and extending into said slot for contact with one side of said ice skate blade, tightening of said set screw forcing the other side of said ice skate blade against a side of said slot.

5. The ice skate blade squareness measuring device of claim 3 wherein said means for securing said portion of said ice skate blade comprises a set screw mounted on said body and extending into said slot for contact with one side of said ice skate blade, tightening of said set screw forcing the other side of said ice skate blade against a side of said slot.

6. The ice skate blade squareness measuring device of claim 1 wherein said means for indicating squareness comprises:
   i) an angle having first and second legs, said first leg designed to rest on said blade edge and said second leg having a predetermined width such that a free edge thereof aligns with at least one of said squareness indicia; and
   ii) a magnet attached to said first leg for removably mounting said first leg to said blade edge.

7. The ice skate blade squareness measuring device of claim 6 wherein said plurality of squareness indicia comprises:
   an indicia line extending substantially across said face and a pair of sets of graduations, wherein said pair are spaced apart from each other, each set of graduations being symmetrical about said indicia line.

8. The ice skate blade squareness measuring device of claim 3 wherein said means for indicating squareness comprises:
   i) an angle having first and second legs, said first leg designed to rest on said blade edge and said second leg having a predetermined width such that a free edge thereof aligns with at least one of said squareness indicia; and
   ii) a magnet attached to said first leg for removably mounting said first leg to said blade edge.

9. The ice skate blade squaring measuring device of claim 8 wherein said plurality of squareness indicia comprises:
   an indicia line extending substantially across said face and a pair of sets of graduations, wherein said pair are spaced apart from each other, each set of graduations being symmetrical about said indicia line.

10. The ice skate blade squaring measuring device of claim 9 wherein said indicia line is spaced from said slot a predetermined distance and said second leg has a height substantially equal to said predetermined distance.

11. An ice skate blade squareness measuring device comprising:
   a) a frame, said frame including an elongated member having a body and a face with a standard line thereon and a pair of spaced apart sets of graduations, said body including a slot therein to receive an ice skate blade, said body including a set screw extending into said slot for aligning a side of said ice skate blade perpendicular to said standard line; and
   b) an angle, said angle having a first leg with a magnet thereon to removably attach said first leg to a skate blade edge of said ice skate blade, said angle having a second leg sized to align with said standard line when said skate blade is square, intersection of a free edge of said second leg and said pair of spaced apart graduations determining a degree of out of squareness of said ice skate blade.

12. A method of determining the squareness of an ice skate blade comprising the steps of:
   a) establishing a standard line generally perpendicular to a side of said ice skate blade, said standard line including two sets of graduations, each said set arranged symmetrically about said standard line, said sets being spaced apart from each other, each gradation spaced from adjacent graduations and having a predetermined squareness value,
   b) producing a squaring line based upon the perpendicularity of a side of said ice skate blade and an edge thereof;
   c) visually comparing said squaring line to said standard line for intersection of said squaring line with a gradation of each set of graduations;
   d) totalling the number of graduations between said intersection and said standard line for each set of graduations; and
   e) determining a value of squareness based on the total number of graduations and said predetermined squareness value.

13. The method of claim 12 wherein said predetermined squareness value is 0.001 inch for each graduation.

* * * * *